![US010919728B2]

(12) United States Patent
Wlasak et al.

(10) Patent No.: US 10,919,728 B2
(45) Date of Patent: Feb. 16, 2021

(54) SPOOL MADE OF A THERMOPLASTIC MATERIAL FOR THE WINDING OF WINDING MATERIAL, AS WELL AS TO A METHOD FOR MANUFACTURING THE SAME

(71) Applicant: Purus Plastics GmbH, Arzberg (DE)

(72) Inventors: Martin Wlasak, Selb (DE); Thomas Manzei, Marktredwitz (DE)

(73) Assignee: PURUS PLASTICS GMBH, Arzberg (DE)

( * ) Notice: Subject to any disclaimer, the term of this patent is extended or adjusted under 35 U.S.C. 154(b) by 0 days.

(21) Appl. No.: 15/903,099

(22) Filed: Feb. 23, 2018

(65) Prior Publication Data

US 2019/0016555 A1   Jan. 17, 2019

(30) Foreign Application Priority Data

Jul. 14, 2017   (DE) .................... 20 2017 104 227 U
Dec. 20, 2017   (EP) ..................................... 17209031

(51) Int. Cl.
   *B65H 75/14*   (2006.01)
   *B65H 75/50*   (2006.01)
   (Continued)

(52) U.S. Cl.
   CPC ........... B65H 75/14 (2013.01); *B23K 20/129* (2013.01); *B29C 65/08* (2013.01); *B29C 65/10* (2013.01);
   (Continued)

(58) Field of Classification Search
   CPC ........ B65H 75/14; B65H 75/22; B65H 75/50; B65H 2701/5122; B65H 2701/5134; B65H 2701/5136
   (Continued)

(56) References Cited

U.S. PATENT DOCUMENTS 3,501,110 A * 3/1970 Hopgood et al. ... B29C 65/0672
                                                    242/118.7
5,495,977 A   3/1996 Hildebrandt et al.
(Continued)

FOREIGN PATENT DOCUMENTS

DE   40 01 250 A1   7/1991
DE   197 00 185 A1   7/1998
(Continued)

OTHER PUBLICATIONS

Machine Translation of JP 11-25643 A, Jan. 29, 1999. (Year: 1999).*

*Primary Examiner* — William E Dondero
(74) *Attorney, Agent, or Firm* — David S. Safran; Roberts Calderon Safran & Cole, P.C.

(57) ABSTRACT

A spool for winding strand-shaped material having flange discs (22, 24) with an outer flange surface and an inner flange surface (21, 23) as well as a method for manufacturing the spool. The discs have a central through bore (30) that is surrounded by an annular recess (25) with an annular wall (26) positioned in the inner flange surface. A tubular spool core (10) has front surfaces which are connected in a materially bonded manner to the annular wall (26) inside the annular recess (25) of the flange discs (22, 24), wherein at least one channel (32) is provided next to the annular wall (26) inside the annular recess (25) for receiving liquefied connection material. The spool core (10) has approximately the same diameter as the annular wall (26) inside the annular recess (25).

6 Claims, 8 Drawing Sheets

(51) Int. Cl.

| | |
|---|---|
| *B29C 65/48* | (2006.01) |
| *B29C 65/20* | (2006.01) |
| *B23K 20/12* | (2006.01) |
| *B65H 75/18* | (2006.01) |
| *B29L 31/00* | (2006.01) |
| *B29C 65/08* | (2006.01) |
| *B29C 65/14* | (2006.01) |
| *B29C 65/00* | (2006.01) |
| *B29C 65/10* | (2006.01) |

(52) U.S. Cl.
CPC .......... *B29C 65/1412* (2013.01); *B29C 65/20* (2013.01); *B29C 65/48* (2013.01); *B29C 66/12441* (2013.01); *B29C 66/30223* (2013.01); *B29C 66/322* (2013.01); *B29C 66/5344* (2013.01); *B29C 66/5346* (2013.01); *B29C 66/712* (2013.01); *B29C 66/73921* (2013.01); *B65H 75/18* (2013.01); *B65H 75/50* (2013.01); *B29C 66/1122* (2013.01); *B29L 2031/704* (2013.01); *B65H 2701/5122* (2013.01); *B65H 2701/5134* (2013.01); *B65H 2701/5136* (2013.01)

(58) Field of Classification Search
USPC ..................................................... 242/608.8
See application file for complete search history.

(56) References Cited

U.S. PATENT DOCUMENTS

| 6,036,138 A | 3/2000 | Sexton et al. |
|---|---|---|
| 2005/0284559 A1 | 12/2005 | Ripplinger et al. |

FOREIGN PATENT DOCUMENTS

| DE | 20 2013 101 355 U1 | 6/2013 | | |
|---|---|---|---|---|
| GB | 2020629 A | * | 11/1979 | ........... G11B 23/037 |
| JP | 11025643 A | * | 1/1999 | ........... B29C 66/124 |
| JP | 2004202828 A | | 7/2004 | |

* cited by examiner

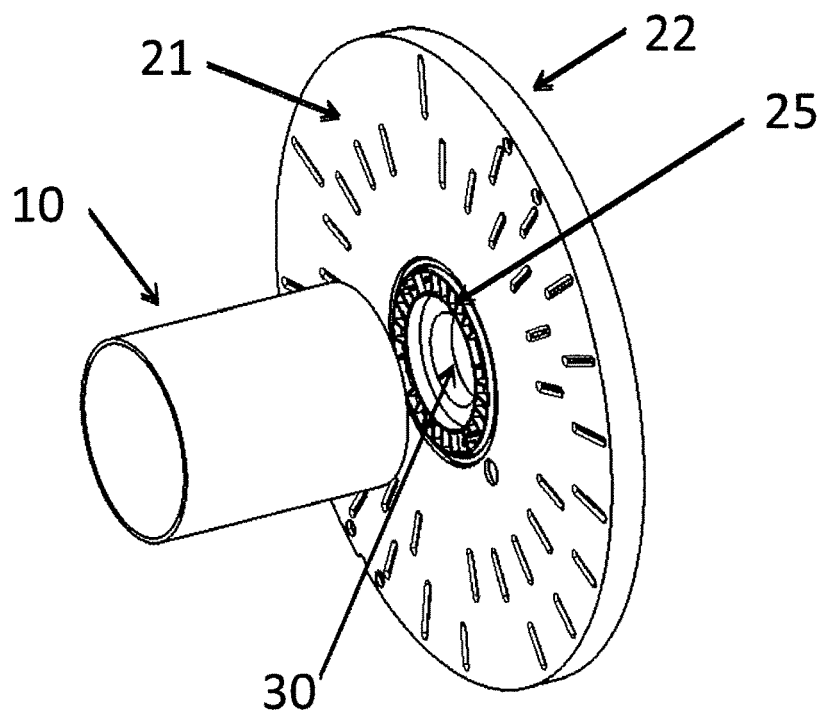
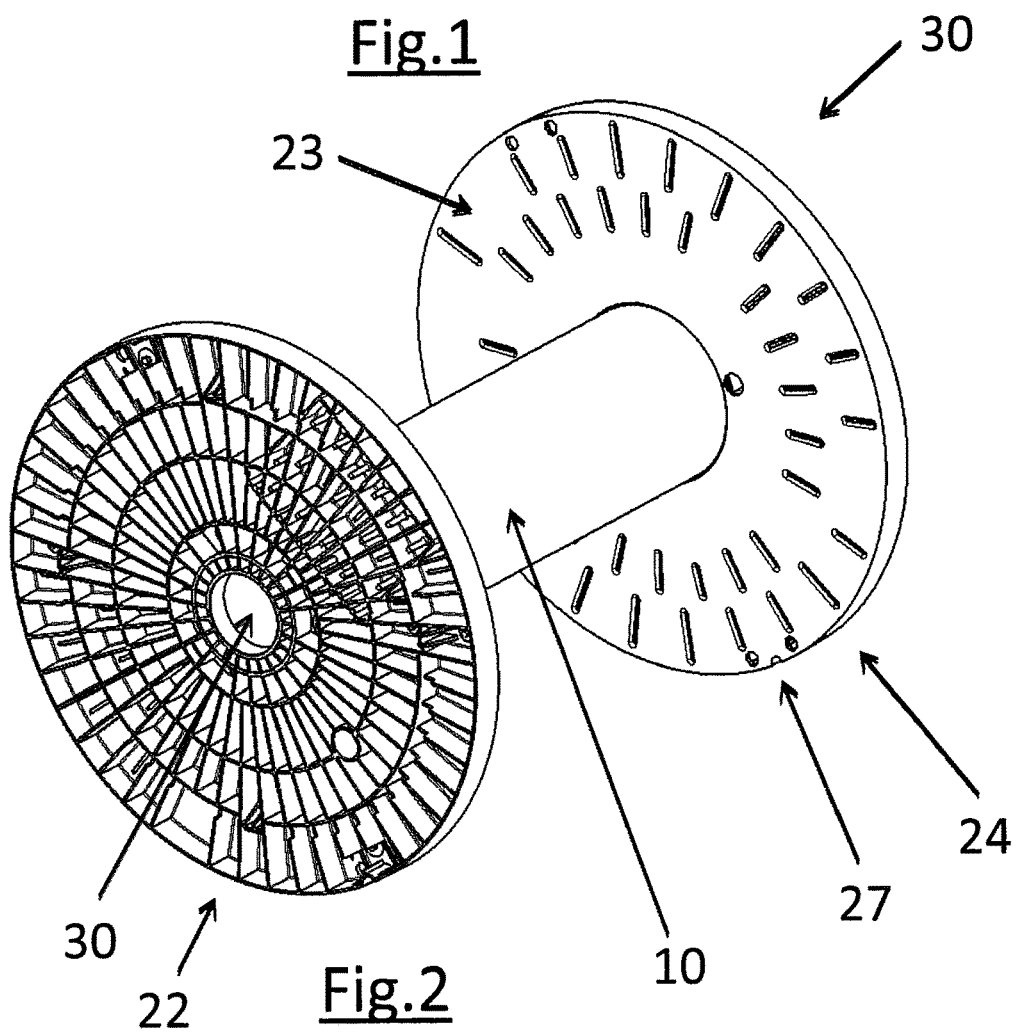
Fig.1
Fig.2

SPOOL MADE OF A THERMOPLASTIC MATERIAL FOR THE WINDING OF WINDING MATERIAL, AS WELL AS TO A METHOD FOR MANUFACTURING THE SAME

BACKGROUND OF THE INVENTION

Field of the Invention

The invention relates to a spool made of a thermoplastic material for the winding of winding material, as well as to a method for manufacturing the same.

Description of Related Art

Spools that are made of multiple starting components and have a hollow core are known in many embodiments. They are used for winding and transporting winding material, e.g., cables, wires, threads, ropes, or plastic bands. Such spools mostly consist of a single-part or multi-part cylindrical or conical spool core and two flange discs at both its ends. The spools can be assembled in various ways.

As for the state of the art, reference is made to German patent applications DE 197 00 185 A1 and DE 40 01 250 A1.

What is described in DE 197 00 185 A1 is a spool having a spool core that conically converges from the two end-side flange discs on both sides of the center, and that is divided in the middle, so that the two spool parts can be stacked in a space-saving manner during empty transportation. The connection of the two spool parts is realized by means of a type of bayonet lock that facilitates a connection of the two parts with a certain preload. The preload prevents that the two spool parts rotate backwards and separate easily. However, this backward rotation is not absolutely excluded if the spool is subject to rough handling or vibrations for a longer period of time, such as for example during transportation.

What has become known from German Utility Model DE 20 2013 101 355 U is a dividable spool for winding up strand-shaped winding material in which the individual components are connected to each other by means of a plug system.

What has become known from U.S. Pat. No. 6,036,138 A is a soldered metal spool for optical fibers or optical waveguides, in which a spool core is affixed in a recess of a flange by means of solder. For this purpose, soldering is used. Soldering is a thermal method for joining materials, wherein a liquid phase is created by melting a solder (fusion soldering) or by means of diffusion at the boundary surfaces (diffusion soldering). While an alloy is created in the course of this process, the work piece is not molten in its depth: The temperature of the molten liquid does not reach that of the base materials. After the solder has solidified, a materially bonded connection of at least two materials the solder and the work piece is created. Therein, it is suggested that the solder joint be formed in an annular recess of the flange adjacent to the central through bore, so that the solder spreads therein, while the spool core rests on a step in the recess in the recess. In this manner, a materially bonded connection is formed in which liquefied material is received inside an annular channel. However, soldering is disadvantageous insofar as it is prone to failure, as a result of which there would be no materially bonded connection between the spool core and the spool flange. The materially bonded connection is realized by means of the soldering material. With soldering, there is always the problem that flaws may occur in the solder, or that the solder is bonded only to an insufficient degree with the materials to be connected, or that it diffuses into the same. Finally, it must be made available in addition to the materials of the spool components and locally applied, which requires additional effort.

Thus, the known spools with a hollow core can be improved, as the connections between the annular flanges and the core were often unable to withstand increased loads, and elaborate methods have been necessary for manufacturing them.

SUMMARY OF THE INVENTION

Thus, the invention is based on the object of creating a spool of the kind as it has been described in the introductory part, which can be manufactured more easily, preferably also in an automated manner, and which offers a high degree of safety against unintended separation of the spool into its individual components.

The object is achieved by a spool as well as a method as described herein.

What is created according to the invention is a spool for winding strand-shaped material (winding material), comprising flange discs having an outer flange surface and an inner flange surface with a centrally arranged central through bore that is surrounded by an annular recess with an annular wall extending therein in the inner flange surface, and a tubular spool core, wherein the spool core consists of a tube having front surfaces that are connected in a materially bonded manner inside the annular recess of the flange discs.

Due to the fact that the spool is constructed of only three individual parts, of which two are identical, it is possible to realize the most diverse dimensions, that is, different spool core diameters and different winding widths, with only two basic parts, namely different annular flanges and spool core tubes.

The most varied winding widths can be realized by selecting spool core tubes (for example, plastic tubes) of different lengths and widths. If an increased bending strength of the spool cores is desired, tubes with reinforcing ribs can be used. Likewise, it is possible to use tubes with formed-in rods or filaments.

The connections for the plastic tubes, in the present case a circumferential annular wall/annular elevation, can be realized in an annular recess of the flange discs with different flange dimensions and tube flange diameters, depending on the requirements. Here, it is insignificant whether the flange has a continuously constant thickness or, for reasons of handling in automatic winding machines and during transportation, has a different thickness in the area of the central through bore as compared to other areas of the flange.

Preferably, the connection of the front surfaces of the spool core tube to the annular wall of the inner flange surfaces is realized by means of a joining technique in which the liquidus temperature of the spool material is exceeded, such as welding, in particular laser beam welding, and conventional joining techniques, such as ultrasonic, vibration or hot plate butt welding, friction welding, hot plate welding, hot air welding, contact plastic welding, infrared welding. In this manner, no additional connection material for the materially bonded connection is required, no waste is produced, and the finished spools can be easily recycled, as they are composed of only one material.

However, it is also possible to glue on the front surface of the spool core by means of solvent adhesion inside the recess of the inner flange surface, or on the circumferential annular wall.

For example, the annular recess can have an inner channel and an outer channel formed therein, as well as an annular wall separating the channels for the molten material, which is connected inside the same to the spool core front surface. In one embodiment, an annular wall extends approximately centrally inside the annular recess inside the flange, wherein on both sides of the same an inner channel and outer channel for the excess material produced during the connection process (melt flow, such as weld beads or surplus material that is liquefied during bonding) is formed.

In a typical embodiment of the invention as a plastic spool, the spool core is an extruded plastic tube. This is advantageous, as such tubes are easily available and can be cut into the desired winding width by simple means, so that, where necessary, they can also be made available at different installation sites, and there can be attached to suitable flange discs. In this manner, transport costs for the tubes can be economized.

In the area of the central bore, the outer surfaces of the flange discs can have catch snap-in recesses, with which the catch of a spool drive or spool brake device can mesh.

Preferably, the plastic tube has approximately the same diameter as the annular wall in the inner flange surface.

Typical spools have a core tube 10 that is 150-700 mm long.

In that case, the core diameters are 110 to 500 mm.

In these embodiments, the central opening, inside which winding tools can mesh, can have a diameter of between 55 and 130 mm.

It is also possible that the connection of the spool core is realized by means of bonding methods inside the recess of the inner flange surface, for example at the circumferential elevation on the recess of the inner flange surface, which is in particular possible if different thermoplastic or easy-to-solvate plastic materials are present.

Preferably, the plastic tube of the spool core has approximately the same diameter and wall thickness as the annular wall in the flange recess, and is connected to this elevation in a materially bonded manner. Any weld beads or liquefied material that may be produced run into the outer and inner channel of the annular recess, and support the connection of the plastic tube of the spool core in that location. The spools can have cores that are 150-700 mm long. In that case, the core diameter is often between 110 to 500 mm, with the central bore often having a diameter of between 55 and 130 mm.

A method for manufacturing a plastic spool for winding strand-shaped material according to the invention comprises the following steps:

a) providing:
two flange discs with an outer flange surface and an inner flange surface and a centrally arranged central through bore that is surrounded by an annular recess in the inner flange surface, and an annular wall inside the annular recess, wherein at least one channel extends inside the annular recess next to an annular wall for receiving liquefied connection material; and a spool core with approximately the same diameter and wall thickness as the annular wall;

b) pressing the spool core tube and annular wall on top of each other; and c) liquefying the material in the contact area between the spool core tube and the annular wall as the liquefied material is flowing into the at least one channel, with a materially bonded connection of the annular wall and the spool core tube front surface being established.

The liquefying of the spool material can be carried out by means of a welding method, but also by means of solvent adhesion methods.

The method can be carried out with metal or plastic materials.

Due to the fact that a modular system for the spool structure has been developed, the most varied spools can be made available in a material-saving manner with a few flange discs and commonly used tube sections.

Thus, the following advantages are achieved by means of the invention, among others:
assembly with easily obtainable means
well-engineered bonding method
The bonding methods have been reliably used for more than ten years.
Recycled plastic material or metal can be used.
Thanks to the completely adhesive bond between the flange and core materials without any solder/adhesive, a low weight and at the same time a high stability is obtained, and the spool can be easily recycled, since it is formed of only a few materials, preferably of only one material.
modular system by means of which different spool geometries (winding width, flange diameter) can be realized.

In the following, preferred exemplary embodiments of the invention are explained in more detail based on the accompanying drawings, with the invention not being limited to these preferred exemplary embodiments.

BRIEF DESCRIPTION OF THE DRAWINGS

FIG. 1 shows a perspective exploded view of individual components of a spool;

FIG. 2 shows a perspective view of an assembled spool;

DETAILED DESCRIPTION OF THE INVENTION

In the following, exemplary embodiments of the invention are described based on a plastic spool. Of course, the disclosed embodiments are only indicated by way of example and can take on alternative forms. The figures are not necessarily to scale; therefore, some features may be exaggerated or minimized in order to clarify details of individual components. Therefore, specific structural and functional details disclosed herein are not to be interpreted in a limiting manner, but rather merely as a representative basis for instructing a person skilled in the art so that they may apply the invention in different ways. As will be understood by a person skilled in the art, features that are shown and described in any figure can be combined with features that are shown in at least one other figure in order to create exemplary embodiments that are not explicitly shown or described. The shown combinations of features are representative exemplary embodiments for typical applications, and may be desirable for certain applications or implementations.

In the following, the invention is described in more detail based on the example of a plastic spool. However, it may be realized with any thermoplastic material.

Figure 6:
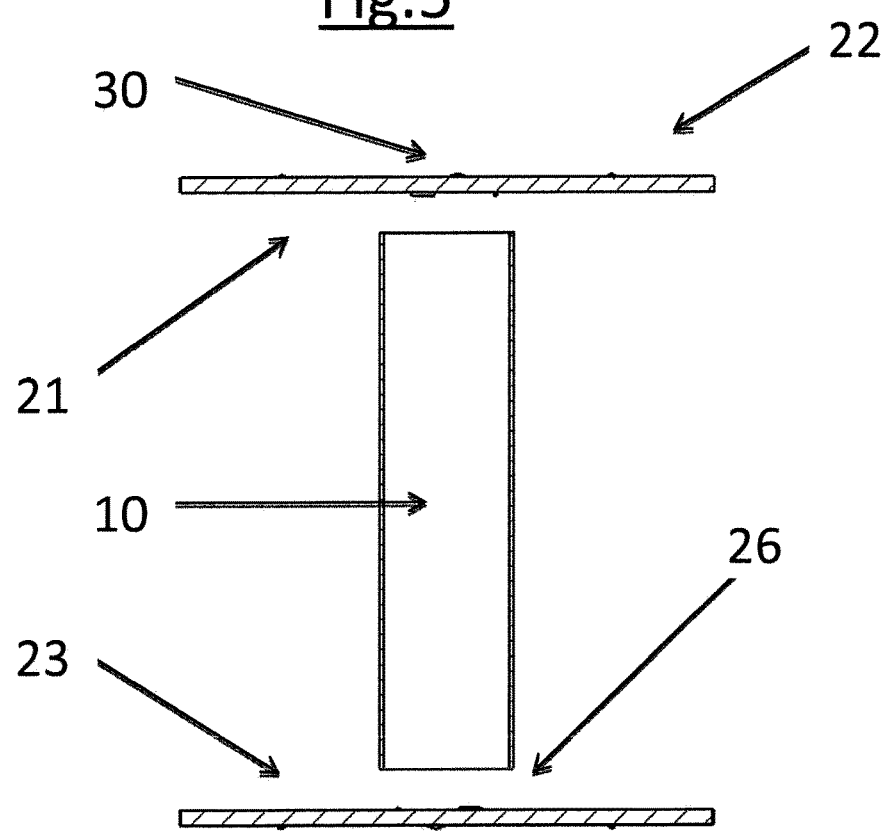
FIG. 6 shows, in a schematic manner, the starting product of a spool in the longitudinal section.

FIG. 1 shows a perspective view of individual parts of a plastic spool according to the invention, comprising a cylindrical spool core 10, with a flange disc 22 being arranged at its end. As can be seen, the spool core 10 is a tube. This is schematically shown in FIG. 6. The flange disc 22 has a central bore 30 and an annular recess 25 on the flange inner side, having a diameter that substantially corresponds to the spool core-tube.

Figure 2A:
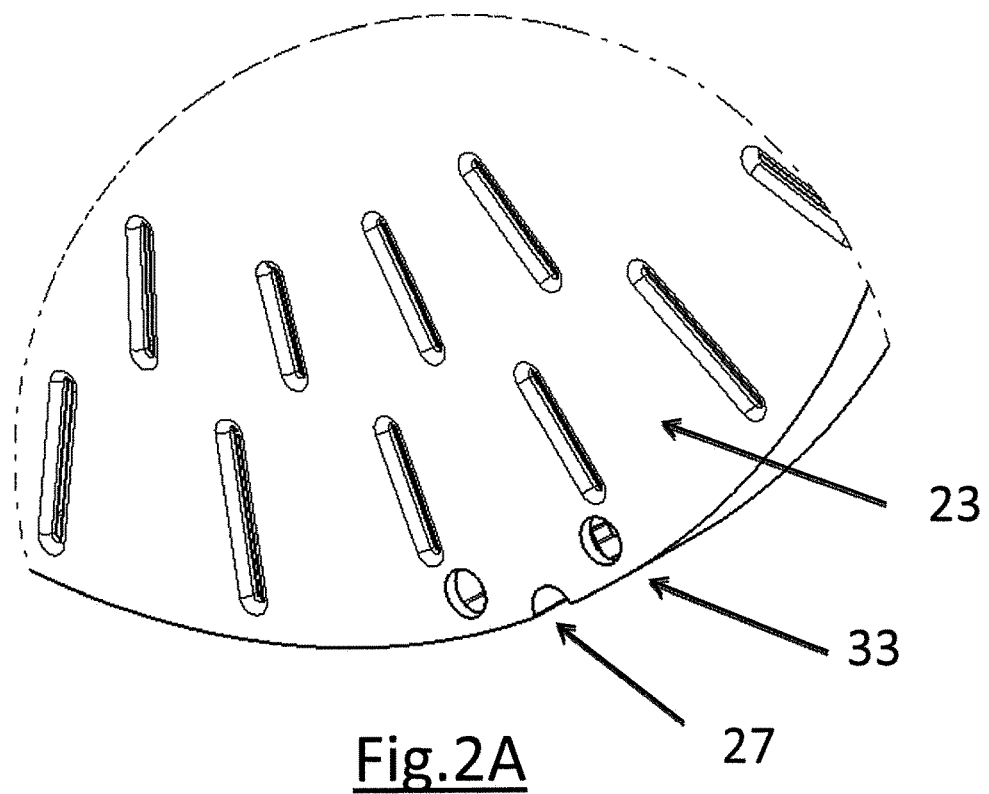
FIG. 2A shows a detail of FIG. 2 with a centering notch and winding material passage openings.

FIG. 2 shows an embodiment of a completely assembled spool according to the invention. Winding material passage holes 33—such as are shown in the detail drawing of FIG. 2A—as well as, where necessary, a centering notch 27 can be formed in the flange discs 22, 23.

Figure 3:
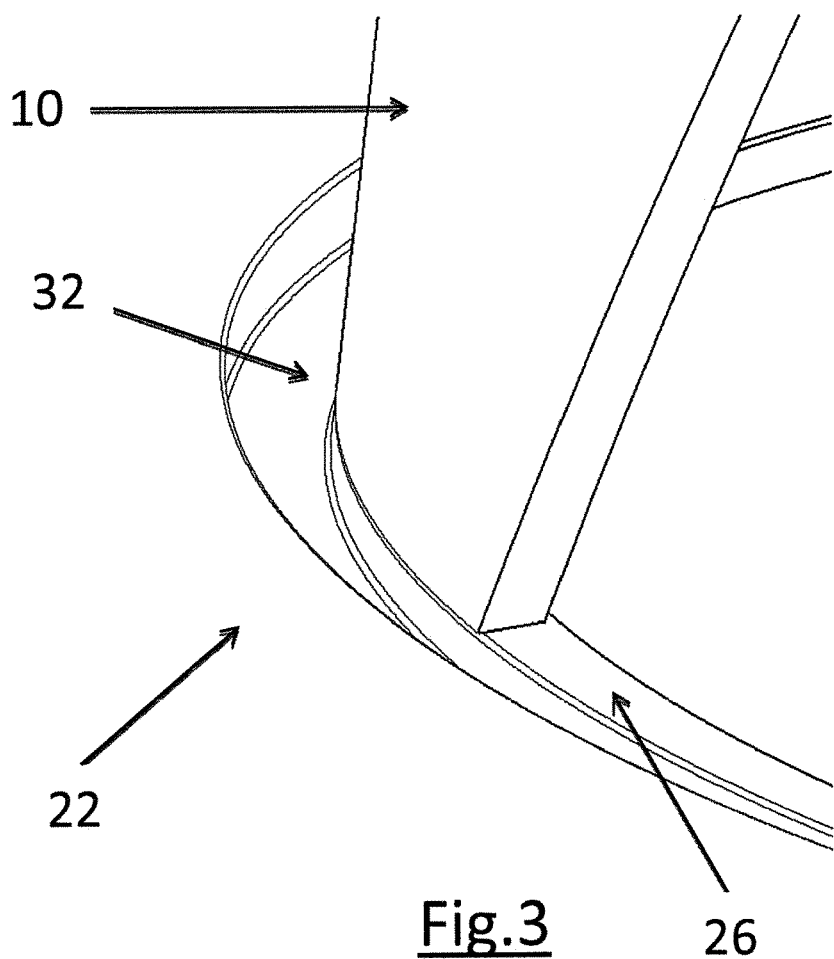
FIG. 3 shows a detail of the inner flange surface with a spool core tube prior to the connection to an annular wall on the annular recess, and an outer channel.
Figure 3A:
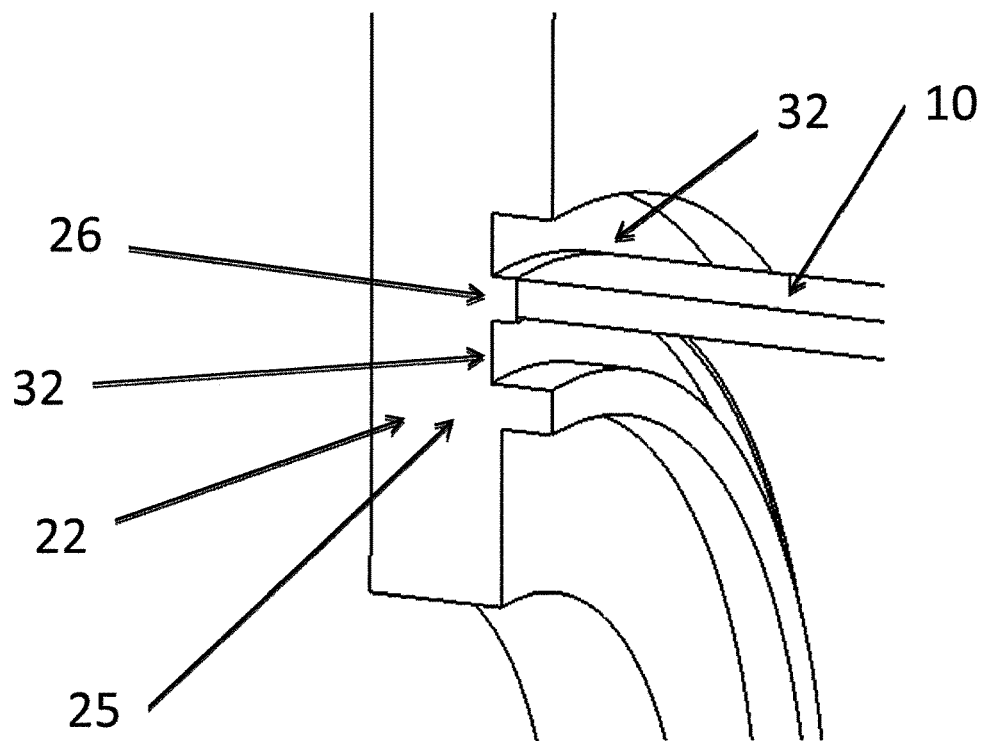
FIG. 3A shows a detail of a further embodiment of the inner flange surface with the spool core tube prior to the connection to an annular wall on the annular recess, and an outer and an inner channel.
Figure 4:
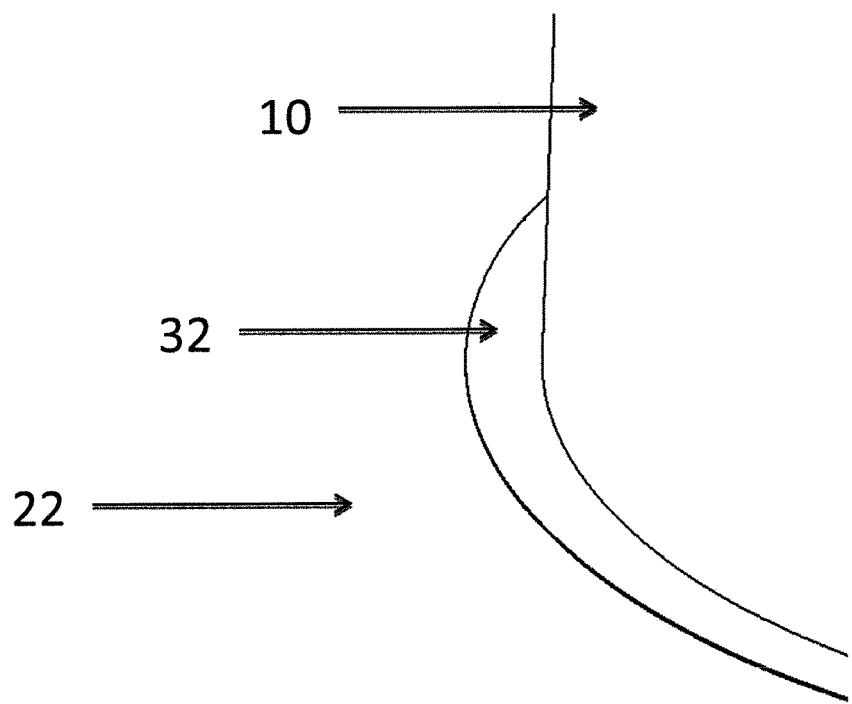
FIG. 4 shows the detail of FIGS. 3 and 3A after the flange and the core have been welded together.
Figure 5:
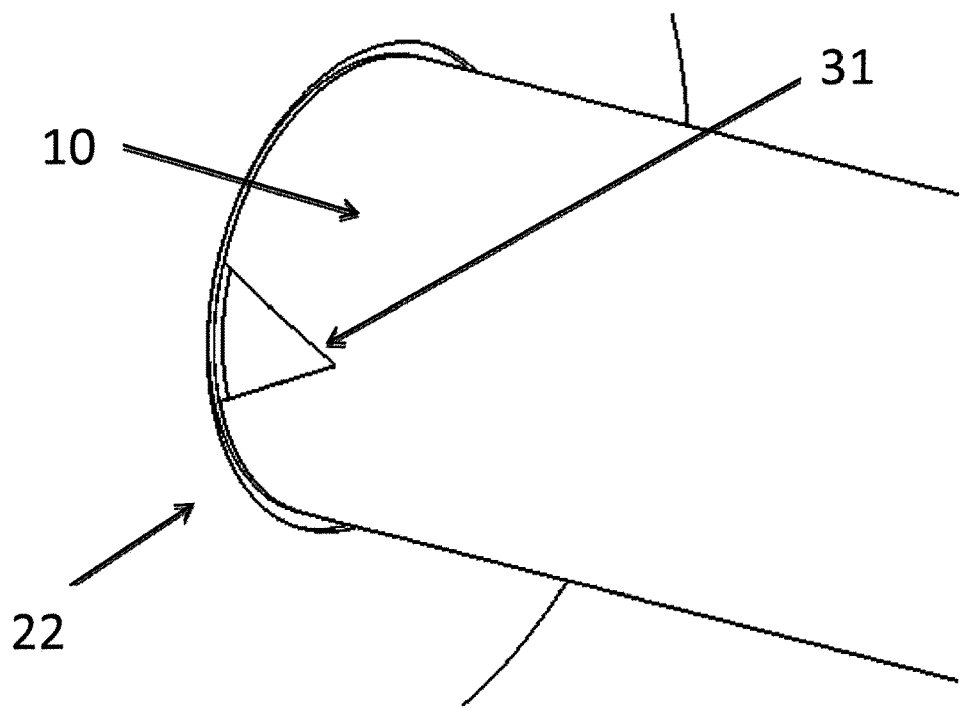
FIG. 5 shows an entry opening for winding material inside the spool core tube for fully automated winding systems.
Figure 7:
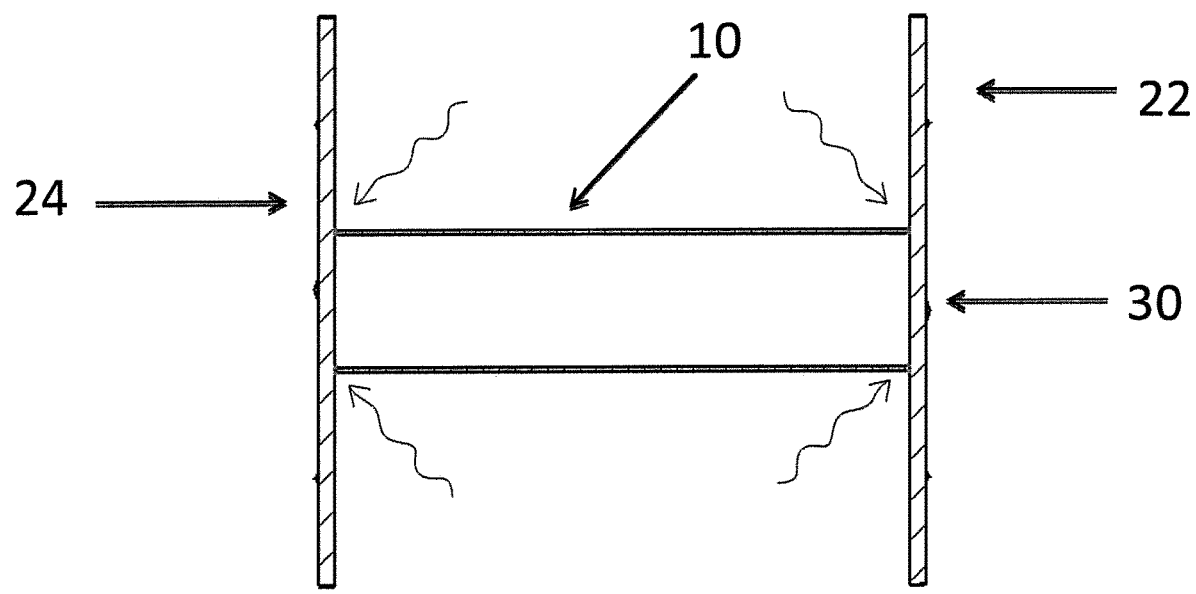
FIG. 7 shows, in a schematic manner, the finished spool in the longitudinal section.

As is schematically shown in detail in FIG. 3, with respect to the spool core 10, the flange disc 22 is arranged in such a manner with an annular wall 26 inside the annular recess 25 that the spool core front surface rests on the annular wall 26 inside the annular recess 25. In this embodiment, a channel 32 is formed externally adjacent to the annular wall 26, with excess material produced during the welding/boding, such as weld beads, running into this channel 32. In the embodiment of FIG. 3A, channels 32 are formed for the same purpose adjacent to the annular wall 26 inside as well as outside. As shown in detail in FIG. 4, in this embodiment, the annular wall 26 is welded together with the spool core front surfaces, as it is also indicated by the wavy lines in FIG. 7. Here, the welding together was carried out by means of hot plate welding, which is a very reliable and commonly used method. The plastic material that is discharged in the course of this process as weld bead is received in the at least one channel 32 inside the annular recess 25 in the flange 22 adjacent to the annular wall 26. In this manner, the formation of weld beads having a negative effect on the spool function is avoided on the spool core 10. In this manner, an entry opening 31 for winding material (see FIG. 5), for example, for cables, inside of which the beginning of the strand is affixed, is not clogged or narrowed in an uncontrolled way, but remains passable in a barrier-free manner even after the welding/bonding.

The spool components 22, 24, 10 can be made of plastic material in their entirety. In that case, the annular wall 26 for the spool core 10 can, for example, be formed directly at the flange discs 22, 24, which may for example be realized by means of injection molding.

The tubular spool cores 10 can be manufactured in the desired length by separating sections of conventional plastic tubes, and can then be connected—preferably welded—to the annular walls 26 at their front surfaces.

The spool core 10 that forms the winding core for the winding material can have perforations through which the winding material can be treated from the inner side of the spool core. In this manner, heated air for drying the winding material may be passed through the perforations, for example. A treatment by means of gasses or liquids is also possible.

Likewise, the flanges 22, 24 can be formed with perforations and thinner sections for the purpose of reducing weight and saving material, as may be seen in FIG. 2. Here, a finished plastic spool is shown in a perspective view, wherein reinforcing ribs and slits in the flanges that serve for weight and material reduction may be clearly seen.

If the application conditions render it necessary, such spools can also be constructed from metal. In that case, the process steps are to be correspondingly selected and adjusted, as is known to the person skilled in the art.

Figure 8A:
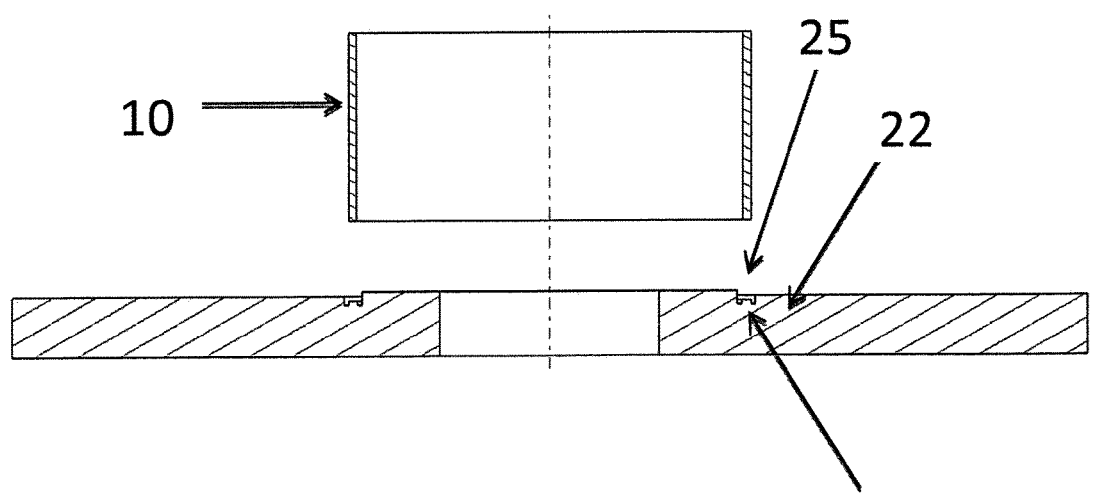
FIGS. 8a-8f show a method for manufacturing a plastic spool according to the invention.
Figure 8B:
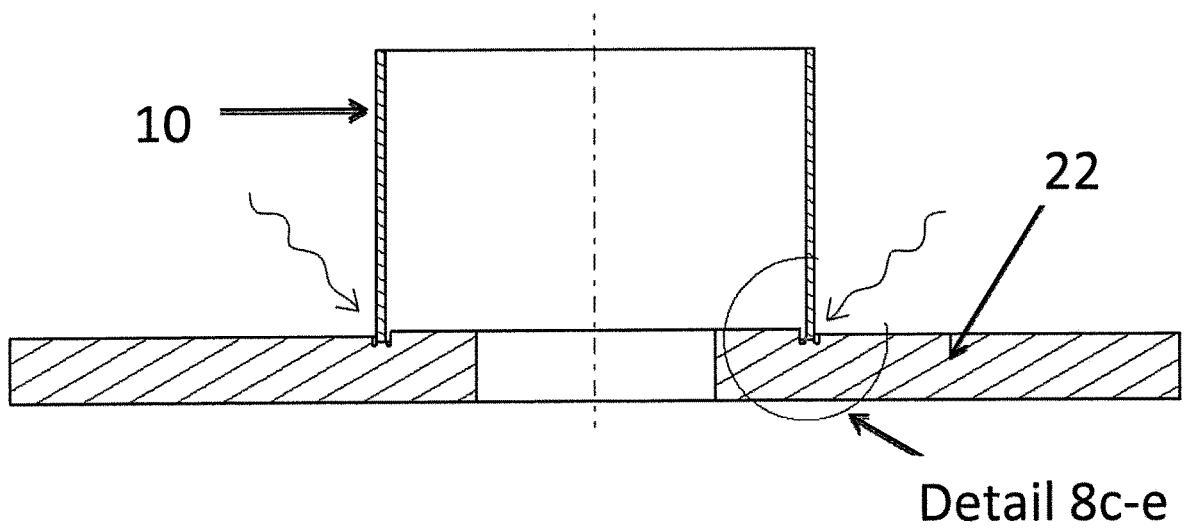
Figure 8C:
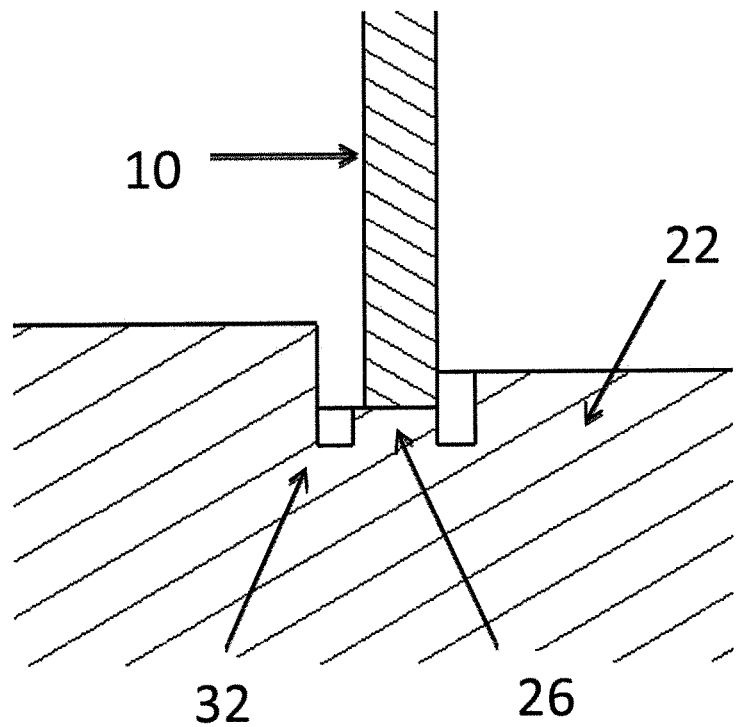
Figure 8D:
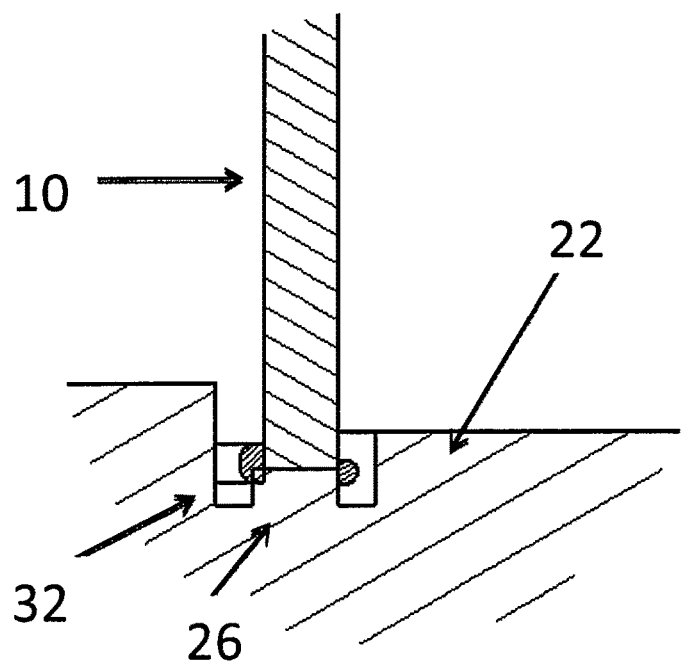
Figure 8E:
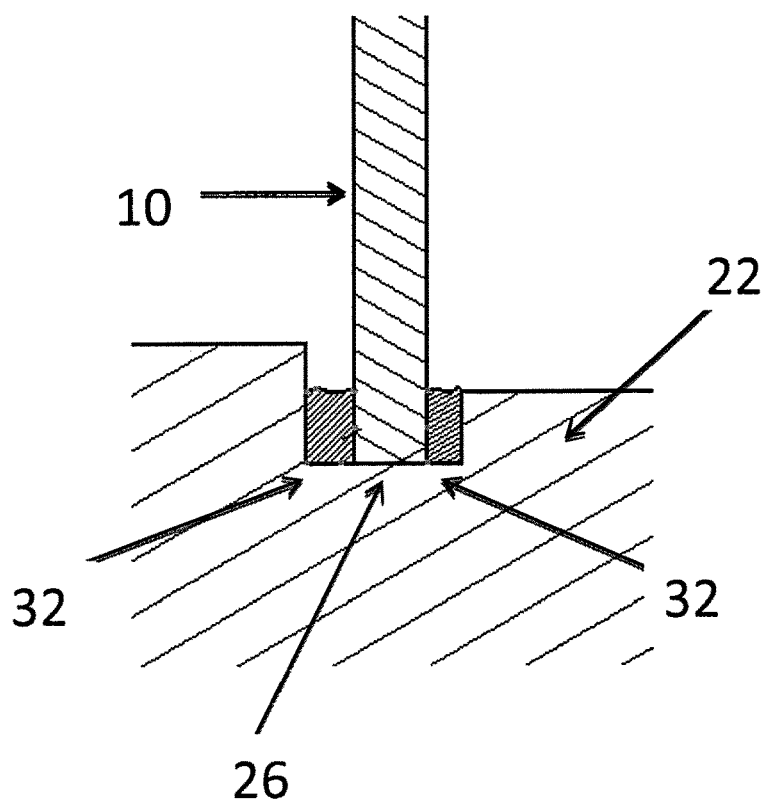
Figure 8F:
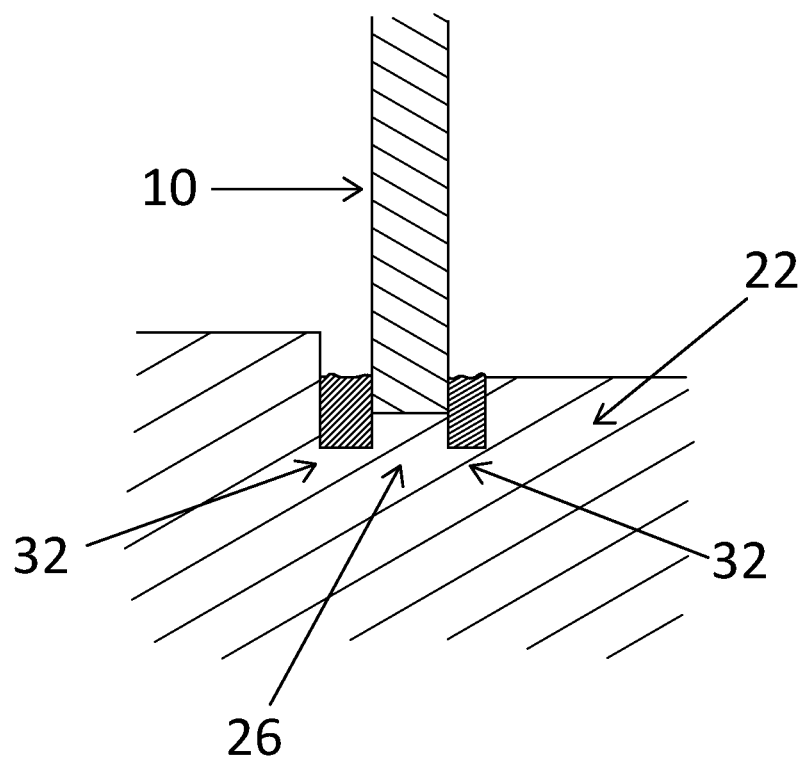

A method for manufacturing a welded plastic spool is shown in a schematic manner in FIGS. 8a to 8f. FIG. 8a shows, in a perspective and schematic rendering in longitudinal section, the plastic tube for the spool core 10 and a flange 22 with an annular recess 25 and an annular wall 26 extending therein. In FIG. 8b, the two structural components are pressed onto each other so as to be aligned in such a manner that the annular wall 26 and the spool core tube front surface lie on top of each other, and are subsequently heated until the plastic material begins to flow (FIG. 8d) and is finally liquefied (FIGS. 8e and 8f), and the flange wall 26 and the plastic tube 10 are welded together in a materially bonded manner, with a solidified material flow/weld bead being formed in the channels 32 of the annular recess 25. As a result of the annular recess 25, the weld bead is substantially flush with the flange surface and does not form an obstruction in the winding space. In this manner, it is possible to create smooth and unobstructed windings up to the flange surface. What is obtained as a result of the materially bonded connection is a connection of the flanges at the spool core having a high tensile strength and loadability.

Although the invention has been explained in more detail based on exemplary embodiments with plastic parts, the person skilled in the art will be familiar with many variations on these embodiments as a part of their expert knowledge. Thus, the description of the invention is provided merely by way of example, and variations such as they are familiar to a person skilled in the art also fall within the scope of the invention as it is defined by the claims.

What is claimed is:

1. A spool for winding strand-shaped material, comprising:
    flange discs having an outer flange surface and an inner flange surface, each of which has a central through bore that is surrounded by an annular recess within the inner flange surface, and
    a one-piece tubular spool core,
    wherein the spool core comprises a tube, end surfaces of which are connected in a materially bonded manner on an annular wall located within the annular recess of the inner flange surfaces of the flange discs,
    wherein at least one channel is provided adjacent to the annular wall in the annular recess for receiving liquefied connection material,
    wherein the spool core has approximately the same diameter as the annular wall and is bonded in the annular recess by said connection material, and
    wherein the diameter of the annular recess is greater than that of the central through bore of the flange surfaces.

2. The spool according to claim 1, wherein the materially bonded connection of the spool core to the annular wall has been formed by means of welding or adhesive bonding.

3. The spool according to claim 1, wherein the spool core is the tube made of a thermoplastic material.

4. The spool according to claim 1, wherein the spool core is 150-700 mm long.

5. The spool according to claim 4, wherein the diameter of the spool core is 110 to 500 mm and the central bore has a diameter between 55 and 130 mm.

6. The spool according to claim 1, wherein the central through bore of the flange discs has a diameter of between 55 and 130 mm.

\* \* \* \* \*